United States Patent [19]

Sato et al.

[11] Patent Number: 4,565,854
[45] Date of Patent: Jan. 21, 1986

[54] POLYMER HAVING THIOL END GROUP

[75] Inventors: Toshiaki Sato; Junnosuke Yamauchi, both of Kurashiki; Takuji Okaya, Nagaokakyo, all of Japan

[73] Assignee: Kuraray Co., Ltd., Kurashiki, Japan

[21] Appl. No.: 592,476

[22] Filed: Mar. 22, 1984

[30] Foreign Application Priority Data

Apr. 7, 1983 [JP] Japan .................................. 58-61745
Apr. 7, 1983 [JP] Japan .................................. 58-61746
Apr. 7, 1983 [JP] Japan .................................. 58-61747
Apr. 8, 1983 [JP] Japan .................................. 58-62671

[51] Int. Cl.$^4$ ............................................. C08F 2/42
[52] U.S. Cl. ..................................... 526/214; 526/224
[58] Field of Search ................ 526/214, 224; 528/360, 528/364, 373

[56] References Cited

U.S. PATENT DOCUMENTS 3,758,447 9/1973 Falk et al. ............................ 526/214
4,450,261 5/1984 Chiao et al. .......................... 526/214

Primary Examiner—Harold D. Anderson

Attorney, Agent, or Firm—Oblon, Fisher, Spivak, McClelland & Maier

[57] ABSTRACT

The present invention relates to a polymer having a thiol group at one end of the molecule, which is obtained by subjecting the monomers capable of radical polymerization to radical polymerization in the presence of a thiolcarboxylic acid and then treating the resulting polymer with an alkali or acid; to a process for producing the same; and to a block copolymer based on the polymer having a thiol group at the end.

The polymer having a thiol group at one end is difficult of forming disulfide linkages by oxidation and thus difficult of becoming insoluble. It is also a highly reactive material that will find wide use in varied application areas such as capture of heavy metals by forming a mercaptide. The block copolymer based on the polymer having a thiol group at the end is superior in compatibility and will find wide use in varied application areas such as surface size for paper, textile fiber finishing, additives for adhesives and paints, and binders for non woven textiles.

9 Claims, No Drawings

POLYMER HAVING THIOL END GROUP

BACKGROUND OF THE INVENTION

1. Field of the Invention

The present invention relates to a polymer having a thiol end group, a process for producing the same, and a block copolymer based on the polymer having a thiol end group. The polymer is obtained by subjecting monomers capable of radical polymerization to radical polymerization in the presence of a thiolcarboxylic acid and then treating the resulting polymer with an alkali or acid.

2. Description of the Prior Art

A thiolcarboxylic acid ester is an important precursor for the synthesis of mercaptans and the introduction of a thiol group, because it is easily decomposed by a base or acid producing a thiol group as a result.

A thiolcarboxylic acid ester is also important for the synthesis of a polymer having thiol groups.

There are proposed some methods for the synthesis of a polymer having thiol groups, as in "Kobunshi Jikken 6" (Experiments in Polymers), pages 367 to 371. According to these methods, vinyl monomers having a thiolcarboxylic acid ester in the side chain undergo radical polymerization and then the resulting polymer is treated with a base or acid so that the thiol group is formed; or a thiolcarboxylic acid is added to the double bond in polyisoprene or polybutadiene to form a thiolcarboxylic acid ester and subsequently the ester is decomposed by a base or acid to form the thiol group.

The thiol groups in a polymer form the secondary structure through the formation of disulfide linkage. This structure plays an important role in activity as observed in proteins and enzymes containing cysteine. Thus it is an extremely interesting subject in biochemistry.

Also in the field of synthetic polymers, many attempts have been made to synthesize a polymer having thiol groups in the side chains. Such a polymer is expected to have an ability to perform oxidation and reduction or an ability to capture heavy metals through the formation of mercaptide. Another effort was directed to the modification of polymers by the polymeric reaction which is induced by the high reactivity of the thiol group. In practice, however, a polymer having thiol groups has not been put to industrial use, because the thiol group is readily oxidized to form a disulfide linkage and the disulfide linkage causes crosslinking, making the polymer insoluble.

SUMMARY OF THE INVENTION

The present inventors carried out researches on the production of a polymer having highly reactive thiol groups which is not insolubilized by oxidation. It was found that such a polymer can be produced as follows: Monomers capable of radical polymerization undergo radical polymerization in the presence of a thiolcarboxylic acid. The thiolcarboxylic acid works as a chain transfer agent, and it is attached to the end of the polymer in the form of thiolcarboxylic acid ester. When the polymer is treated with an alkali or acid, the thiolcarboxylic acid ester is decomposed. Thus there is obtained a polymer having a thiol end group. The present invention was completed based on this finding.

The present inventors also found that when monomers capable of radical polymerization undergo radical polymerization in the presence of the polymer having a thiol end group, a variety of block copolymers having good compatibility can be obtained. The present invention was also completed based on this finding.

The thiolcarboxylic acid used in this invention includes organic thiolcarboxylic acids having the —COSH group. Where the thiolcarboxylic acid is represented by R-COSH, R denotes a $C_{1-18}$, preferably $C_{1-5}$, aliphatic hydrocarbon group such as an alkyl or aromatic hydrocarbon group. Examples of thiolcarboxylic acids include thiolacetic acid, thiolpropionic acid, thiolbutyric acid, and thiolvaleric acid. Thiolacetic acid is preferable because of its decomposability.

DETAILED DESCRIPTION OF THE INVENTION

There are no restrictions as to the monomers which undergo radical polymerization in the presence of a thiolcarboxylic acid, so long as they are capable of radical polymerization. Examples of such monomers include vinyl esters such as vinyl acetate, vinyl formate, vinyl propionate, vinyl laurate, and vinyl stearate; α-olefins such as ethylene, propylene, and isobutylene; acrylic acid, methacrylic acid, and esters thereof such as methyl acrylate, ethyl acrylate, butyl acrylate, 2-ethylhexyl acrylate, dodecyl acrylate, 2-hydroxyethyl acrylate, methyl methacrylate, ethyl methacrylate, butyl methacrylate, 2-ethylhexyl methacrylate, dodecyl methacrylate, 2-hydroxyethyl methacrylate, dimethylaminoethyl acrylate, dimethylaminoethyl methacrylate, and quaternary products thereof; acrylamide monomers such as acrylamide, methacrylamide, N-methylolacrylamide, N,N-dimethylacrylamide, and acrylamide-2-methylpropane sulfonic acid and sodium salt thereof; aromatic vinyl monomers such as styrene, α-methylstyrene, and p-styrenesulfonic acid and sodium salt and potassium salt thereof; acrylonitrile and methacrylonitrile; N-vinylpyrrolidone; and halogen-containing vinyl monomers such as vinyl chloride, vinyl fluoride, vinylidene fluoride, and tetrafluoroethylene. They may be used individually or in combination with one another.

Vinyl ether, allyl ether, allyl ester, and the like, which are incapable of or difficult of radical polymerization when used individually, may be used as a copolymer component. However, dienes, which form a polymer having double bonds, are not preferable, because the thiol formed by the decomposition of a thiolcaroxylic acid ester is added to the double bond in the polymer.

Preferable among the above-mentioned monomers capable of radical polymerization are vinyl esters, acrylic acid, methacrylic acid, acrylic esters, methacrylic esters, acrylamide, methacrylamide, acrylonitrile, methacrylonitrile, vinyl halides, aromatic vinyl monomers, and α-olefins. Most suitable among them are vinyl esters, acrylic esters, methacrylic esters, acrylic acid, methacrylic acid, acrylamide, methacrylamdie, and vinyl halides.

According to this invention, the monomers capable of radical polymerization are polymerized in the presence of a thiolcarboxylic acid, and the radical polymerization can be accomplished by bulk polymerization, solution polymerization, pearl polymerization, or emulsion polymerization in the presence of a radical polymerization initiator. A suitable method should be selected according to the properties of the monomer and the intended polymer. There are no restrictions as to the quantity of a thiolcarboxylic acid to be added to the polymerization system and as to the method of adding a thiolcarboxylic acid to the polymerization system. A proper selection should be made according to the desired properties of the intended polymer. The polymerization may be performed batchwise, semibatchwise, or continuously.

The radical polymerization initiator that can be used in this invention includes the ordinary initiators such as 2,2'-azobisisobutyronitrile, benzoyl peroxide, and carbonate peroxide. The azo-initiator, such as 2,2'-azobisisobutyronitrile is preferable because of its ease of handling. Radiation and electron rays can also be used as the initiator. The polymerization temperature is usually 10° to 90° C., depending on the kind of initiator used.

After the polymerization is complete, unreacted monomers are removed from the resulting polymer having a thiolcarboxylic acid ester at the end, and the polymer is treated with an alkali or acid so that the thiolcarboxylic acid ester is decomposed. Thus there is obtained a polymer having a thiol end group.

The alkali or acid treatment should preferably be performed in a solvent that dissolves or swells the polymer. The use of such a solvent is preferable for the control of reaction rate and selectivity. The alkali or acid treatment can be carried out with any one of sodium hydroxide, potassium hydroxide, ammonia, dimethylamine, diethylamine, hydrochloric acid, sulfuric acid, acetic acid, etc. Selection should be made according to the chemical properties of the polymer. For example, a strong alkali such as sodium hydroxide is not suitable for a polyacrylate. It decomposes the ester in the polymer as well as the thiolcarboxylic acid ester at the end. Thus the polymer is not obtained as intended. In such a case, a weak alkali such as ammonia should be used under a proper condition so that the ester of the polymer is not decomposed. The selective decomposition of a thiolcarboxylic acid ester at the end can be accomplished by properly selecting the solvent, alkali, acid, reaction temperature, reaction time, etc. according to the individual polymers.

The polymer having a thiol end group is not restricted in the composition, degree of polymerization, and molecular weight distribution. They should be properly established according to the intended use of the polymer. The polymer obtained as mentioned above is a new, highly reactive material that will find use in a broad application area. The reactivity of the thiol end group will make it possible to add the polymer to a compound having double bonds, to replace the end group with a halogen compound, and to apply the polymer to redox reaction in combination with an oxidizing agent.

In addition, the polymer having a thiol end group is utilized for the production of a block copolymer by radical polymerization which is performed in the presence of the polymer. (This will be described later.)

In what follows, a detailed description is made of the polymer having a thiol end group produced by polymerizing vinyl esters as the monomers capable of radical polymerization. The polymer is represented by the formula P.SH, wherein P contains at least one kind of the constituent units A and B represented by the following formulas.

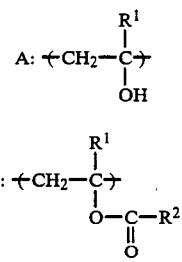

(wherein $R^1$ is hydrogen or a $C_{1-6}$ hydrocarbon group, and $R^2$ is hydrogen or a $C_{1-20}$ hydrocarbon group.) This polymer is designated as X hereinafter.

In an embodiment ($X_1$) of the polymer (X), the content of B is not less than 50 mol% and not greater than 100 mol%, and the degree of polymerization is lower than 3500.

The polymer ($X_1$) is produced by polymerizing vinyl monomers composed mainly of vinyl esters in the presence of a thiolcarboxylic acid, and then treating the resulting polymer with ammonia or an amine.

The vinyl ester polymer thus obtained has a thiol group at only one end. Therefore, it does not become insoluble even when the disulfide linkage is formed by oxidation, unlike the conventional polymer having thiol groups which are randomly distributed in the main chain of the molecule.

Examples of the constituent unit A include vinyl alcohol, α-methylvinyl alcohol, α-ethylvinyl alcohol, α-propylvinyl alcohol, α-butylvinyl alcohol, and α-hexylvinyl alcohol. Examples of the constituent unit B include vinyl acetate, vinyl formate, vinyl propionate, vinyl laurate, and vinyl stearate, and α-substituted products thereof.

It is essential that the vinyl ester polymer contain the constituent unit B or both of the constituent units A and B. It may contain other constituent units than A and B so long as the content of B is greater than 50 mol%. The content of the constituent unit B should preferably be greater than 70 mol% for adequate solubility in organic solvents.

Examples of other constituent units than A and B include the units of ethylene, propylene, isobutene, acrylic acid, methacrylic acid, salts and alkyl esters thereof, acrylonitrile, methacrylonitrile, acrylamide, methacrylamide, trimethyl-3-acrylamide-3-dimethylpropyl)ammonium chloride, ethyl vinyl ether, butyl vinyl ether, N-vinyl pyrrolidone, vinyl chloride, vinyl fluoride, vinylidene chloride, vinylidene fluoride, tetrafluoroethylene, and other vinyl esters than the constituent unit B.

The vinyl ester polymer is not restricted in the degree of polymerization. However, it should be lower than 3500, preferably lower than 2000, more suitably lower than 1000, the lower limit being about 10, if the thiol end group is to function effectively. The vinyl ester polymer will be effectively used in the application of the conventional vinyl ester polymer such as a paint vehicle; but it will find new uses as a functional material owing to the reactivity of the thiol end group; for example, addition to a compound having double bonds, substitution reaction with a halogen compound, and combination with an oxidizing agent for redox decomposition reaction. The special polymer composition of vinyl ester polymer having a thiol group at only one end thereof is utilized for polymerizing monomers capable of radical polymerization in the presence of the vinyl ester polymer to form a block copolymer in which the vinyl ester polymer constitutes one component.

The process for producing the vinyl ester polymer having a thiol end group has the following features. That is, a vinyl monomer mainly composed of vinyl ester such as vinyl acetate is polymerized in the presence of a thiolcarboxylic acid to give a vinyl ester polymer having a thiolcarboxylic acid ester group at the end, and the polymer is subsequently treated with ammonia or an amine. In this way, the thioester linkage at the end is decomposed to thiol but most of the vinyl ester units in the main chain remain undecomposed.

Any vinyl ester can be used so long as it is capable of radical polymerization. Examples of vinyl esters include vinyl formate, vinyl acetate, vinyl propionate, vinyl ester of Versatic acid, vinyl laurate, and vinyl stearate. Preferable among them is vinyl acetate because of its polymerizability and stability. These vinyl esters may be copolymerized with the above-mentioned copolymerizable monomers.

Various methods may be used for treating with ammonia or an amine the vinyl ester polymer having a thiolcarboxylic acid ester group at the end. For a reasonable reaction rate and selectivity, the treatment should preferably be carried out in a solvent that dissolves or swells the vinyl ester polymer. Examples of such a solvent include methanol, ethanol, acetone, dioxane, benzene, and toluene. Most suitable among them is methanol. It is inexpensive, it permits smooth reaction, and it works as a good solvent for polymerization. Examples of amines include methylamine, ethylamine, propylamine, dimethylamine, diethylamine, triethylamine, and other alkylamines; ethanolamine, propanolamine, triisopropanolamine, and other alkanolamine; and aniline, dimethylaniline, and other aromatic amines. However, treatment with ammonia water, or liquid or gaseous ammonia is industrially preferable.

The reaction temperature and time should be suitably established according to the kind of amine to be used. They should be moderate in order that the thiolcarboxylic acid ester at the end is selectively decomposed and the ester linkage in the main chain remains undecomposed. The preferred reaction temperature is 20° to 60° C.

When the reaction is complete, the polymer is discharged in the usual way such as precipitation with a non-solvent. The discharged polymer should preferably be washed with a non-solvent such as water and purified by reprecipitation with water from an acetone solution.

In another embodiment ($X_2$) of the polymer (X), the content of A is not greater than 100 mol% and not less than 50 mol%, and the degree of polymerization is lower than 3500, preferbly lower than 2000, and more suitably lower than 1000, the lower limit being about 10 but with no restriction.

The vinyl alcohol polymer ($X_2$) having a thiol end group is produced by polymerizing vinyl monomers composed mainly of vinyl esters in the presence of a thiolcarboxylic acid, and then saponifying the resulting vinyl ester polymer.

The vinyl alcohol polymer thus obtained has a thiol group at only one end. Therefore, it does not become insoluble even when the disulfide linkage is formed by oxidation, unlike the conventional polymer having thiol groups which are randomly distributed in the main chain of the molecule.

This vinyl alcohol polymer is represented by the above-mentioned formula P.SH. It contains the constituent unit A or both of the constituent units A and B. The content of B should be greater than 50 mol%, and preferably greater than 70 mol% for adequate solubility in water. The constituent units A and B and other constituent units than A and B are those which are described above for the vinyl ester polymer ($X_1$) haivng a thiol end group. The polymerization is carried out in the same way as mentioned above.

The vinyl ester polymer having a thiolcarboxylic acid ester at the end is subsequently saponified in the usual way. Saponification is usually carried out in an alcohol, particularly methanol. Both absolute alcohol and water-containing alcohol can be used, and the alcohol may contain methyl acetate, ethyl acetate, and other organic solvents. The saponification temperature should be 10° to 70° C. The preferred catalyst for saponification is sodium hydroxide, potassium hydroxide, sodium methylate, or potassium methylate. The quantity of the catalyst is determined according to the degree of saponification and the quantity of water. It is more than 0.001 mol, preferably more than 0.002 mol for 1 mol of the vinyl ester unit; and the upper limit is 0.2 mol. When used excessively, the alkaline catalyst remains unremoved in the polymer and causes discoloration. In the case where the vinyl ester polymer contains carboxyl groups or esters thereof which react with an alkali, the quantity of the alkaline catalyst should be increased accordingly.

As the result of the saponification reaction, the end of the polymer chain changes into a thiol group and the main chain of the polymer changes into vinyl alcohol. The degree of saponification of the vinyl ester unit in the main chain may be changed according to the intended use of the polymer. The polymer that separates out after saponification should be purified by washing with methanol to remove the alkali metal salt of acetic acid. After drying, the polymer is obtained in the form of white powder.

The vinyl alcohol polymer having a thiol end group will be effectively used for the application of a conventional vinyl alcohol polymer such as paper coating and textile finishing; but it will find new uses as a functional material owing to the reactivity of the thiol end group. For example, it may be added to a compound having double bonds, it may be used to substitute a halogen compound, and it may be combined with an oxidizing agent for redox decomposition reaction. The special polymer composition of the vinyl alcohol polymer having a thiol group at only one end is utilized for polymerizing monomers capable of radical polymerization in the presence of the vinyl alcohol polymer to form a block copolymer in which the vinyl alcohol polymer constitutes one component.

In what follows, a detailed description is made of the block copolymer which is obtained by subjecting monomers capable of radical polymerization to radical polymerization in the presence of the polymer having a thiol end group.

The polymer having a thiol end group which is used for producing the block copolymer can be obtained in any one of the following ways. According to the first method, a polymer having hydroxyl groups at the ends is subjected to chemical reaction so that the hydroxyl groups are changed into thiol groups. For example, the two terminal hydroxyl groups of polyethylene glycol or polypropylene glycol are changed into halides or sulfonic acid esters, and then thiourea is added to form an isothiuronium salt, and finally the isothiuronium salt is hydrolyzed with an alkali. According to the second method, the polymer is formed by condensation polymerization of a dithiol and a diamine or diisocyanate. According to the third method, monomers capable of radical polymerization undergo radical polymerization in the presence of a thiolcarboxylic acid such as thiolacetic acid, and the resulting polymer is treated with an alkali or acid, whereby a thiol group is introduced into one end of the polymer molecule. For example, vinyl ester, methyl methacrylate, styrene, or the like undergoes radical polymerization in the presence of a thiolcarboxylic acid, and the resulting polymer is treated with an alkali or acid, whereby there is obtained polyvinyl ester, polyvinyl alcohol, polymethyl methacrylate, or polystyrene having a thiol end group. (The third method has been described in the foregoing.) There are another methods for introducing a thiol group into the end of the polymer molecule. According to the present invention, no restrictions are made on the method of synthesis, and any polymer having a thiol end group can be used. The one obtained according to the third method can be most effectively used in this invention.

The above-mentioned method for producing the block copolymer has a feature that radical polymerization is carried out in the presence of a polymer having a thiol end group. The radical polymerization can be accomplished by bulk polymerization, solution polymerization, pearl polymerization, or emulsion polymerization. A suitable method should be selected according to the desired properties of the polymer. The polymerization may be performed batchwise, semibatchwise, or continuously. There are no restrictions as to the method and process of polymerization so long as the polymer having a thiol end group exists in the polymerization system when polymerization is performed. There are no restrictions as to the quantity of the polymer having a thiol end group to be added to the polymerization system and as to the method of adding it to the polymerization system. A proper selection should be made according to the desired properties of the intended block copolymer.

The radical polymerization for the block copolymer is performed in the presence of an ordinary radical polymerization initiator such as 2,2'-azobisisobutyronitrile, benzoyl peroxide, lauroyl peroxide, diisopropyl peroxycarbonate, potassium persulfate, and ammonium persulfate. In the case where the polymer having a thiol end group is one which is capable of polymerization in an aqueous system, like polyethylene glycol or polyvinyl alcohol, the redox polymerization is possible which is brought about by the thiol end group of the polymer and an oxidizing agent such as potassium bromate, potassium persulfate, ammonium persulfate, and hydrogen peroxide. Potassium bromate is preferred for the synthesis of the block copolymer, because it does not form radicals independently under the ordinary polymerization condition, but forms radicals only when decomposed by the redox reaction with the thiol end group of the polymer.

In the production of the block copolymer, the polymerization system should preferably be kept acid for radical polymerization in the presence of the polymer having a thiol end group. If the polymerization is performed under a basic condition, the thiol group is added ionically to the double bond of the monomer and disappears. Polymerization in an aqeuous system should preferably be performed at pH 4 or below.

Another constituent component of the block copolymer of this invention is a homopolymer or random copolymer of the monomers capable of radical polymerization. There are no specific restrictions on the composition, molecular weight, and molecular weight distribution. The monomers capable of radical (co)-polymerization include vinyl acetate, vinyl formate, vinyl propionete, vinyl laurate, vinyl stearate, and other vinyl ester; ethylene, propylene, isobutylene, and other olefins; acrylic acid, methacrylic acid, methyl acrylate, ethyl acrylate, butyl acrylate, 2-ethylhexyl acrylate, dodecyl acrylate, 2-hydroxyethyl acrylate, methyl methacrylate, ethyl methacrylate, butyl methacrylate, 2-ethylhexyl methacrylate, dodecyl methacrylate, 2-hydroxyethyl methacrylate, dimethylaminoethyl acrylate, dimethylaminoethyl methacrylate, and quaternary products thereof; acrylamide, methacrylamide, N-methylolacrylamide, N,N-dimethylacrylamide, acrylamide-2-methylpropanesulfonic acid, and sodium salts thereof, and other acrylamide monomer; styrene, α-methyl styrene, p-styrenesulfonic acid, and sodium salts and potassium salts thereof, and other aromatic vinyl monomers; acrylonitrile, methacrylonitrile, and N-vinylpyrrolidone. Also included in the monomers are vinyl chloride, vinyl fluoride, vinylidene fluoride, tetrafluoroethylene, and other vinyl halides. These monomers are used individually or in combination with one another. Preferable among them are vinyl esters, acrylic acid, methacrylic acid, acrylic esters, methacrylic esters, acrylamide, methacrylamide, acrylonitrile, methacrylonitrile, vinyl halides, aromatic vinyl compounds, and α-olefins. Most suitable among them are vinyl esters, acrylic esters, methacrylic esters, acrylic acid, methacrylic acid, acrylamide, methacrylamide, and vinyl halides. In the case where the block copolymer is to be produced, it is necessary to select the monomers capable of radical polymerization which will constitute the polymer component different from the polymer component having a thiol end group.

The polymer having a thiol end group which is used for producing the block copolymer should preferably be the above-mentioned polymers X, $X_1$, and $X_2$. The polymer $X_2$ is most suitable.

The block copolymer is composed of two components. One component is the polymer (such as X, $X_1$, and $X_2$) having a thiol end group, and the other component is a homopolymer or random copolymer of monomers capable of radical polymerization. The polymer is not limited in its composition, molecular weight, and molecular weight distribution. The ratio (by weight) of the other component to the polymer having a thiol end group should be 1/99 to 99/1, preferably 1/9 to 9/1, and more suitably 1/5 to 5/1.

The block copolymer having as one component the polymer $X_1$ (vinyl ester polymer) obtained according to this invention has properties which are different from those of a polymer blend. For example, the polymer constituting one component of the block copolymer is miscible with the polymer constituting the other component of the block copolymer. Thus the block copolymer will find wide use as a dispersing agent for molding materials such as film and sheet, emulsifier, cement additive, binder for inorganic materials such as ceramics, adhesive, and photosensitive resin material.

According to one of the most preferred embodiments, the block copolymer is prepared from the polymer $X_2$ (PVA) having a thiol end group. The block copolymer is described in the following.

The block copolymer having as one component the polymer $X_2$ (PVA) is available in varied forms. The PVA polymer may be a homopolymer or copolymer having a different degree of polymerization and saponification, or having a different composition in copolymer. The other component of the block copolymer is a polymer formed from proper monomers capable of radical polymerization. The polymer may also has a different composition and molecular weight. For example, water soluble PVA block copolymer is obtained by using as the other component of the block copolymer a monomer providing a water soluble polymer, such as acrylic acid, acrylamide, dimethylaminoethyl methacrylate, or sodium p-styrenesulfonate. Such a block copolymer is obtained in the form of aqueous solution if polymerization is performed in an aqueous system, and the aqueous solution can be used as such after polymerization. In the case where the polymer constituting the other component of the block copolymer is composed of a monomer providing a water insoluble polymer, such as acrylic ester or methacrylic ester, the block copolymer is obtained in the form of emulsion if polymerization is performed in an aqueous system. The emulsion can be used as such after polymerization.

According to the process of this invention, it is possible to produce the block copolymer composed of the PVA polymer and the polymer lacking alkali resistance like the vinyl ester or acrylic ester polymer. Such a block copolymer cannot be obtained by saponifying a block copolymer having a vinyl ester polymer as one component, because the other component lacking alkali resistance is also hydrolyzed in the saponification process.

The block copolymer having the PVA polymer as one component has widely varied properties which are different from those of a blend polymer as mentioned above. For example, compatibility of the polymer constituting one component of the block copolymer and the polymer constituting the other component of the block copolymer is good. Thus the block copolymer will find use in broad application areas. For example, internal size and surface size for paper, paper coating material, textile sizing, warp sizing agent, fiber finishing agent, coating medium, coating compound for glass fiber, metal surface coating, defogging agent (blur-preventing agent); adhesives for wood, paper, aluminum foil, plastics and the like; binders for non-woven textile, fibers, gypsum board, fiber board and the like; thickner for emulsion-type adhesives; additive for urea resin adhesive; binders and additives for inorganic materials such as cement, mortar, and ceramics; adhesives such as hot melt adhesive and pressure-sensitive adhesive; dispersing agent for emulsion polymerization of ethylene, styrene, vinyl acetate, (meth)acrylic ester, vinyl chloride, vinylidene chloride, acrylonitrile, and other ethylenic unsaturated monomer, and butadiene monomer; dispersing agent and stabilizer for pigment in coating materials and adhesives; dispersing agent and stabilizer for suspension polymerization of vinyl chloride, vinylidene chloride, styrene, (meth)acrylic ester, vinyl acetate, and other ethylenic unsaturated monomers; fiber, film, sheet, pipe, tube, water-soluble fiber, temporary film, and other moldings; humectant for hydrophobic resins; additives for compound fiber and film; blending with synthetic resin; soil conditioner and soil stabilizer; and photosensitive resins.

A block copolymer composed of a polyvinyl alcohol component and a polymer component having amide groups or having amide groups and carboxyl groups (e.g., polyacrylamide, polymethacrylamide, poly-N,N-dimethylacrylamide, and a copolymer of acrylamide and acrylic acid) imparts strength and rigidity to paper when used as a paper coating material. In addition, a block copolymer composed of a polyvinyl alcohol component and a polymer component having carboxyl groups (including metal salt and ammonium salt thereof) (e.g., polyacrylic acid and polymethacrylic acid), a block copolymer composed of a polyvinyl alcohol component and a polymer component having cationic groups (e.g., acrylamide propyltrimethyl ammonium chloride), and a block copolymer composed of a polyvinyl alcohol component and a polymer component having amide groups or having amide groups and carboxyl groups improves the tearing strength, breaking length, bursting strength, folding resistance, and IGT pick, when used as a beater additive.

The invention is now described in detail with reference to the following non-limitative examples, in which quantities are expressed as parts or % by weight.

EXAMPLE 1

Into a reactor were charged 290 parts of methyl methacrylate (abbreviated as MMA hereinafter) and 4.6 parts of thiolacetic acid. The atmosphere in the reactor was thoroughly replaced with nitrogen. With the external temperature of the reactor raised to 85° C., polymerization was carried out for 1.5 hours by adding 10 parts of MMA containing 0.3 part of 2,2'-azobisisobutyronitrile. Conversion to polymer was 78.8%. The polymerization product was diluted with acetone and the solution was poured into n-hexane to precipitate the polymer. Unreacted MMA was removed from the polymer by repeating three times reprecipitation with water from an acetone solution.

200 g of this polymer was dissolved in a mixed solvent of acetone (320 g) and methanol (80 g). To the solution was added 12 g of 10% NaOH solution in methanol. Reaction was performed at 40° C. for 2.5 hours. The solution was poured into 5 liters of water containing 50 ml of 1N $H_2SO_4$. The polymer which had separated out and precipitated in water was filtered off and rinsed thoroughly with water and dried. Thus there was obtained PMMA having a thiol group at one end. This PMMA was formed to have an intrinsic viscosity [$\eta$] of 0.06 (dl/g) as measured in acetone at 30° C. The quantity of the thiol group was $9.99 \times 10^{-5}$ eq/q as determined by iodimetry in acetone/water.

EXAMPLE 2

Into a reactor were charged 290 parts of n-butyl methacrylate (abbreviated as BMA hereinafter) and 3.2 parts of thiolacetic acid. The atmosphere in the reactor was thoroughly replaced with nitrogen. With the internal temperature of the reactor heated to 85° C., polymerization was carried out for 2 hours by adding 10 parts of BMA containing 0.3 part of 2,2'-azobisisobutyronitrile. Conversion to polymer was 75.2%. The polymerization product was diluted with acetone and the solution was poured into methanol to precipitate the polymer. Unreacted BMA was removed from the polymer by repeating three times reprecipitation with methanol from the acetone solution.

200 g of this polymer was dissolved in a mixed solvent of acetone (320 g) and methanol (80 g). To the solution was added 10 g of 10% NaOH solution in methanol. Reaction was performed at 40° C. for 2.5 hours. The solution was poured into 5 liters of water containing 40 ml of 1N $H_2SO_4$. The polymer which had separated out and precipitated in water was filtered off and rinsed thoroughly with water and dried. Thus there was obtained PBMA having a thiol group at one end. This PBMA was found to have an intrinsic viscosity [$\eta$] of 0.07 (dl/g) as measured in acetone at 30° C. The quantity of the thiol group was $6.82 \times 10^{-5}$ eq/g as determied by iodimetry in acetone/water.

EXAMPLE 3

Into a reactor were charged 290 parts of styrene and 2.5 parts of thiolacetic acid. The atmosphere in the reactor was thoroughly replaced with nitrogen. With the internal temperature of the reactor heated to 60° C., polymerization was carried out for 2 hours by adding 10 parts of styrene containing 0.3 part of 2,2'-azobisisobutyronitrile. Conversion to polymer was 15.2%. The polymerization product was poured into methanol to precipitate the polymer. Unreacted styrene was removed from the polymer by repeating three times reprecipitation with methanol from an acetone solution.

35 g of this polymer was dissolved in a mixed solvent of acetone (100 g) and methanol (10 g). To the solution was added 12 g of 10% NaOH solution in methanol. Reaction was performed at 40° C. for 2.5 hours. The solution was poured into 5 liters of water containing 50 ml of 1N $H_2SO_4$. The polymer which had separated out and precipitated in water was filtered off and rinsed thoroughly with water and dried. Thus there was obtained polystyrene having a thiol end group at one end. This polystyrene was found to have an intrinsic viscosity [$\eta$] of 0.10 (dl/g) as measured in acetone at 30° C. The quantity of the thiol group was $7.50 \times 10^{-5}$ eq/q as determined by iodimetry in acetone/water.

EXAMPLE 4

Into a reactor were charged 290 parts of acrylic acid and 6.1 parts of thiolacetic acid. The atmosphere in the reactor was thoroughly replaced with nitrogen. With the internal temperature of the reactor heated to 60° C., polymerization was carried out for 2 hours by adding 10 parts of acrylic acid containing 0.3 part of 2,2'-azobisisobutyronitrile. Conversion to polymer was 35.2%. The polymerization product was poured into acetone to precipitate the polymer. Unreacted acrylic acid was removed from the polymer by repeating three times reprecipitation with methanol from an acetone solution.

90 g of this polymer was dissolved in 100 g of methanol. To the solution was added 50 ml of 1N HCl in methanol. Reaction was performed at 40° C. for 5 hours. The solution was poured into acetone. The polymer which had separated out and precipitated in acetone was filtered off and rinsed thoroughly with acetone. The polymer was reprecipitated twice with acetone from the water and dried. Thus there was obtained polyacrylic acid having a thiol group at one end of the molecule. The sodium salt of the polyacrylic acid was found to have an intrinsic viscosity [$\eta$] of 0.2 (dl/g) as measured in NaOH aqueous solution (2 mol/liter) at 30° C. The quantity of the thiol group was $9.65 \times 10^{-5}$ eq/g as determined by iodimetry in water.

EXAMPLE 5

Into an autoclave were charged 100 parts of tetrafluoroethylene, 20 parts of thiolacetic acid, and 1.0 part of 2,2'-azobisisobutyronitrile. Polymerization was carried out at 80° C. for 5 hours. Unreacted thiolacetic acid was removed under reduced pressure. 100 parts of methanol was added under a nitrogen stream. After dissolution, 1.5 g of 28% solution of sodium methylate was added. The solution was stirred at room temperature for 1 hour. 10 ml of 1N HCl methanol solution was added, and then 1 liter of distilled water was added. The lower oil layer was discharged and distilled. Thus there was obtained 20 g of a fraction of 40°–80° C./3 mmHg, which is polytetrafluoroethylene having a thiol group at one end. The quantity of the thiol group was $3.0 \times 10^{-3}$ eq/g as determined by iodimetry in acetone/water.

EXAMPLE 6

Into a reactor were charged 2400 parts of vinyl acetate (abbreviated as VAc hereinafter) and 580 parts of methanol. The atmosphere in the reactor was thoroughly replaced with nitrogen. The reactor was externally heated to 65° C., and when the internal temperature reached 60° C., 0.93 part of thiolacetic acid and 20 parts of methanol containing 0.868 part of 2,2'-azobisisobutyronitrile were added. Immediately thereafter, 60 parts of methanol solution containing 17.4 parts of thiolacetic acid was added at a constant rate over 5 hours. Conversion to polymer was 50.4% after 5 hours. After cooling, unreacted VAc was distilled away together with methanol under reduced pressure by adding methanol to the reactor continuously. Thus there was obtained a 64.5% solution of PVAc in methanol. The PVAc was saponified into PVA at 40° C. in the condition so that the concentration of PVAc was 50% and the molar ratio of NaOH to VAc became 0.05. This PVA was washed with methanol by using a Soxhlet apparatus. The intrinsic viscosity [$\eta$] was measured in water at 30° C. and the viscometric average degree of polymerization ($\bar{P}$) was determined to be 130 according to the equation of $[\eta] = 7.51 \times 10^{-3} \bar{xP}^{0.64}$. The degree of saponification was 98.6%.

The quantity of thiol group in the PVA as determined by iodimetry was $1.87 \times 10^{-4}$ eq/g-PVA. The number-average degree of polymerization was calculated at 127 from the content of the thiol group. These facts suggest that the thiol group exists at only one end. This can also be inferred from the polymerization mechanism employed.

EXAMPLE 7

Into a reactor were charged 2400 parts of vinyl acetate (abbreviated as VAc hereinafter) and 580 parts of methanol. The atmosphere in the reactor was thoroughly replaced with nitrogen. The reactor was externally heated to 65° C., and when the internal temperature of the reactor reached 60° C., 5 parts of thiolacetic acid was added and then 20 parts of methanol containing 0.868 part of 2,2'-azobisisobutyronitrile. Polymerization was carried out for 2 hours. Conversion to polymer was 20.5%. After cooling, unreacted VAc was distilled away together with methanol under reduced pressure. This step was repeated by adding methanol to the reactor. Thus there was obtained a 45.2% solution of PVAc in methanol. To a portion of this methanol solution was added a methanol solution of NaOH so that the concentration of PVAc became 30% and the molar ratio of NaOH to VAc became 0.05. The PVAc was saponified into PVA at 40° C. This PVA was washed with methanol by using a Soxhlet apparatus. The degree of polymerization measured in the same way as in Example 6 was 90, and the degree of saponification was 99.0 mol%.

The quantity of thiol group in the PVA as determined by iodimetry was $2.90 \times 10^{-4}$ eq/g-PVA. The presence of the terminal thiol group was confirmed.

EXAMPLES 8 TO 10

Polymerization was carried out as in Example 6, with the quantity of thiolacetic acid varied, and the resulting polymer was saponified to give PVA. Table 1 shows the conditions of polymerization and the quantity of thiol group in the product.

TABLE 1

| Example No. | Quantity of thiolacetic acid added (parts) Initial | Quantity of thiolacetic acid added (parts) Subsequent | Conversion to polymer after 5 hr (%) | Degree of saponification (mol %) | Degree of polymerization | Quantity of thiol group (eg/g-PVA) |
|---|---|---|---|---|---|---|
| 8 | 0.45 | 8.41 | 65.7 | 98.7 | 250 | $1.30 \times 10^{-4}$ |
| 9 | 0.29 | 5.4 | 66.0 | 99.0 | 412 | $9.08 \times 10^{-5}$ |
| 10 | 0.16 | 3.0 | 68.2 | 98.5 | 567 | $5.44 \times 10^{-5}$ |

EXAMPLE 11

Into a reactor were charged 2400 parts of vinyl formate and 580 parts of methanol. The atmosphere in the reactor was thoroughly replaced with nitrogen. The reactor was heated externally to 65° C., and when the internal temperature reached 60° C., 6.3 parts of thiolacetic acid was added and then 20 parts of methanol containing 0.868 part of 2,2'-azobisisobutyronitrile. Polymerization was carried out for 2 hours. Conversion to polymer was 19.7%. After cooling, unreacted vinyl formate was distilled away together with methanol under reduced pressure. This step was repeated by adding methanol to the reactor. Thus there was obtained a 39.8% solution of polyvinyl formate in methanol. To a portion of this methanol solution was added a methanol solution of NaOH so that the concentration of polyvinyl formate became 30% and the molar ratio of NaOH to vinyl formate became 0.05. The polyvinyl formate was saponified into PVA at 40° C. This PVA was washed with methanol by using a Soxhlet apparatus. The degree of polymerization measured in the same way as in Example 6 was 92, and the degree of saponification was 98.7 mol%.

The quantity of thiol group in the PVA as determined by iodimetry was $3.05 \times 10^{-4}$ eq/g-PVA. The presence of the terminal thiol group was confirmed.

EXAMPLE 12

Into a reactor were charged 2400 parts of vinyl acetate (abbreviated as VAc hereinafter) and 580 parts of methanol. The atmosphere in the reactor was thoroughly replaced with nitrogen. The reactor was externally heated to 65° C., and when the internal temperature reached 60° C., 1.10 parts of thiolpropionic acid and 20 parts of methanol containing 0.868 part of 2,2'-azobisisobutyronitrile were added. Immediately thereafter, 60 parts of methanol solution containing 20.6 parts of thiolpropionic acid was added at a constant rate over 5 hours. The rate of polymerization was 49.6%. After cooling, unreacted VAc was distilled away together with methanol under reduced pressure. This step was repeated by adding methanol to the reactor. Thus there was obtained a 65.3% solution of PVAc in methanol. To a portion of this methanol solution was added a methanol solution of NaOH so that the concentration of PVAc became 50% and the molar ratio of NaOH to VAc became 0.05. The PVAc was saponified into PVA at 40° C. This PVA was washed with methanol by using a Soxhlet apparatus. The degree of polymerization measured in the same way as in Example 6 was 120, and the degree of saponification was 99.0 mol%.

The quantity of thiol group in the PVA as determined by iodimetry was $1.85 \times 10^{-4}$ eq/g-PVA. The presence of the terminal thiol group was confirmed.

EXAMPLE 13

Into a reactor were charged 2400 parts of vinyl acetate (abbreviated as VAc hereinafter) and 580 parts of methanol. The atmosphere in the reactor was thoroughly replaced with nitrogen. The reactor was externally heated to 65° C., and when the internal temperature reached 60° C., 0.93 part of thiolacetic acid and 20 parts of methanol containing 0.868 part of 2,2'-azobisisobutyronitrile were added. Immediately thereafter, 60 parts of methanol solution containing 17.4 parts of thiolacetic acid was added at a constant rate over 5 hours. Conversion to polymer was 50.4%. After cooling, unreacted VAc was distilled away together with methanol under reduced pressure. This step was repeated by adding methanol to the reactor. Thus there was obtained a 64.5% solution of PVAc in methanol.

To 31 g of this methanol solution was added 5 ml of 25% ammonia water with stirring at 25° C. for 10 minutes. The solution was poured into water to precipitate the polymer. The polymer was purified by reprecipitation with water from an acetone solution. The intrinsic viscosity $[\eta]$ measured in acetone at 30° C. was used to obtain the viscometric average degree of polymerization according to the equation of $[\eta] = 7.94 \times 10^{-3} x \overline{P}^{0.64}$. The viscometric average degree of polymerization was 125. The content of vinyl alcohol units calculated from the degree of saponification was 10.2 mol%.

The iodimetry in methanol/water (80/20 by weight) indicated the presence of thiol groups in an amount of $1.41 \times 10^{-4}$ eq/g-PVAc. The number-average degree of polymerization was calculated at 82 from the content of the thiol group. These facts suggest that the thiol group exists at only one end. This can also be inferred from the polymerization mechanism employed.

EXAMPLE 14

Into a reactor were charged 2400 parts of VAc and 580 parts of methanol. The atmosphere in the reactor was thoroughly replaced with nitrogen. The reactor was externally heated to 65° C., and when the internal temperature of the reactor reached 60° C., 5 parts of thiolacetic acid was added, and then 20 parts of methanol containing 0.868 part of 2,2'-azobisisobutyronitrile was dded. Polymerization was performed for 2 hours. Conversion to polymer was 20.5%. After cooling unreacted VAc was distilled away together with methanol under reduced pressure. This step was repeated by ading methanol to the reactor. Thus there was obtained a 45.2% solution of PVAc in methanol.

To 44.3 g of this methanol solution was added 5 ml of 25% ammonia water with stirring at 25° C. for 10 minutes. The solution was poured into water to precipitate the polymer. The polymer was purified by reprecipitation with water from an acetone solution.

The degree of polymerization as measured in the same way as in Example 13 was 92, and the content of vinyl alcohol was 9.8 mol%. The iodimetry in methanol/water (80/20 by weight) indicated the presence of thiol end group in an amount of $1.50 \times 10^{-4}$ eq/g-PVAc.

EXAMPLES 15 TO 17

Polymerization was carried out as in Example 13, with the quantity of thiolacetic acid varied, to give PVAc. The PVAc was treated with 25% ammonia water to give PVAc having thiol end groups. The results are shown Table 2.

in the polymers before and after heating. This indicates that the polymers are not oxidized in the air and do not form the disulfide linkage of thiol groups.

EXAMPLE 19

Polymer No. 1 Polyethylene glycol having two thiol groups at both ends was prepared as follows:

500 g of polyethylene glycol (average molecular weight: 3000, a product of Nippon Oils and Fats Co., Ltd.) was dissolved in a mixed solvent of methylene chloride (200 ml) and pyridine (80 g). To the solution was added 200 g of tosyl chloride. Reaction was performed at 25° C. for 12 hours. The resulting salt was filtered off and the filtrate was poured into a large excess of ether so that polyethylene glycol ditosylate separated out. The product was filtered off, washed thoroughly with ether, and dried. 500 g of this polyethylene glycol ditosylate was dissolved in 300 ml of ethanol. To this solution was added 50 g of thiourea, and reaction was performed under reflux for 96 hours.

TABLE 2

| Example No. | Quantity of thiolacetic acid added (parts) Initial | Quantity of thiolacetic acid added (parts) Subsequent | Conversion to polymer after 5 hr (%) | Concentration of PVAc methanol solution (%) | Ammonia treatment PVAc methanol solution (g) | Ammonia treatment 25% ammonia water | Ammonia treatment Reaction time | Quantity of thiol group (eq/g-PVAc) | Degree of polymerization | Content of vinyl alcohol (mol %) |
|---|---|---|---|---|---|---|---|---|---|---|
| 15 | 0.45 | 8.41 | 65.7 | 60.5 | 33.1 | 5 ml | 10 min | $7.10 \times 10^{-5}$ | 248 | 9.6 |
| 16 | 0.29 | 5.4 | 66.0 | 53.2 | 37.6 | 3 ml | 10 min | $4.60 \times 10^{-5}$ | 405 | 7.2 |
| 17 | 0.16 | 3.0 | 68.2 | 48.5 | 41.3 | 3 ml | 10 min | $2.91 \times 10^{-5}$ | 510 | 5.8 |

EXAMPLE 18

Into a reactor were charged 1920 parts of vinyl acetate (abbreviated as VAc hereinafter), 480 parts of vinyl ester of Versatic acid ("Veova 10", a product of Shell Chemical) and 580 parts of methanol. The atmosphere in the reactor was thoroughly replaced with nitrogen. The reactor was externally heated to 65° C., and when the internal temperature reached 60° C., 0.50 part of thiolacetic acid and 20 parts of methanol containing 0.868 part of 2,2'-azobisisobutyronitrile were added. Immediately thereafter, 60 parts of methanol solution containing 11.5 parts of thiolacetic acid was added at a constant rate over 5 hours. Polymerization was performed for 5 hours. Conversion to polymer was 49.6%. After cooling, unreacted VAc was distilled away together with methanol under reduced pressure. This step was repeated by adding methanol to the reactor. Thus there was obtained a 47.2% methanol solution of a copolymer composed of vinyl acetate and vinyl ester of Versatic acid.

To 42.4 g of this methanol solution was added 3 ml of 50% dimethylamine solution with stirring at 25° C. for 10 minutes. The solution was poured into water to precipitate the polymer. The polymer was purified by reprecipitation twice with hexane from an acetone solution. The intrinsic viscosity [η] of the copolymer as measured in acetone at 30° C. was 0.14. The content of vinyl alcohol calculated from the degree of saponification was 9.8 mol%. The iodimetry in methanol/water (80/20 by weight) indicated the presence of thiol end groups in an amount of $0.98 \times 10^{-4}$ eq/g-polymer.

In the meantime, the polymers having thiol end groups which were obtained in Examples 1 to 18 were heated in the air at 70° C. for 24 hours. The heated polymers were completely soluble in the solvent used for the iodimetry for the determination of thiol groups. No change was observed in the content of thiol groups Then, 27 g of sodium hydroxide and 300 g of distilled water were added under a nitrogen stream, and reaction was performed under reflux for 3 hours. After cooling to room temperature, the solution was neutralized to pH 3 to 3.5 with 10% aqueous solution of $H_2SO_4$. The reaction product was extracted with 1 liter of methylene chloride. Thus there was obtained a solution of α,ω-dithiolpolyoxyethylene in methylene chloride. This solution was then poured into ether to precipitate α,ω-dithiolpolyoxyethylene. This product was reprecipitated twice with methanol from the ether solution. The content of thiol groups in this product as determined by iodimetry was $5.64 \times 10^{-4}$ eq/g.

Polymer No. 2 (Polymethyl methacrylate having a thiol end group as obtained in Example 1)

Ten parts of polymer No. 1 was dissolved in 110 parts of distilled water, and the solution was adjusted to pH 3 with 0.5N $H_2SO_4$. To the solution was added 10 parts of N,N-dimethylacrylamide and then 10 parts of an aqueous solution containing 0.94 part of potassium bromate. Polymerization was performed at 30° C. for 2 hours. Conversion to polymer was 100.1%. There was obtained a 14.4% aqueous solution of block copolymer of polyethylene glycol and poly(N,N-dimethylacrylamide).

This block copolymer was made into film by casting a 10% aqueous solution. On the other hand, a 10% aqueous solution of polymer blend having the same composition as the block copolymer was also made into film by casting. (This polymer blend is a mixture of polyethylene glycol and poly(N,N-dimethylacrylamide.) The film made of the block copolymer was clear and uniform, whereas the film made of the mixture was cloudy with phase separation.

EXAMPLE 20

Ten parts of No. 1 polymer (prepared in Example 19) was dissolved in 110 parts of distilled water, and the solution was adjusted to pH 3 with 0.5N $H_2SO_4$. To the solution was added 10 parts of acrylamide. The atmosphere was replaced with nitrogen, and the reactor was heated to 60° C. Polymerization was started by adding an aqueous solution containing 0.94 g of potassium bromate at a constant rate of 2 ml/5 min over 30 minutes. The polymerization came to an end in 90 minutes. The Conversion to polymer was 99.3%. Thus there was obtained a 14.2% (solid concentration) aqueous solution of PEG-polyacrylamide block copolymer. A clear film was obtained from this aqueous solution by casting.

EXAMPLE 21

Polymerization was carried out under the same conditions as in Example 20, except that acrylamide was replaced by methyl acrylate. The polymerization came to an end in 2 hours. Conversion to polymer was 98.7%. Thus there was obtained a 14.1% (solid concentration) aqueous dispersion of PEG-polymethyl acrylate block copolymer. A clear film was obtained from this aqueous dispersion by casting.

EXAMPLE 22

0.1 part of PVA 217 (polyvinyl alcohol, degree of polymerization: 1700, degree of saponification: 88 mol%, Product of Kuraray Co., Ltd.) was dissolved in 100 parts of water at 90° C. The solution was cooled to 60° C. under a nitrogen stream. To this solution was added a styrene solution composed of 100 parts of styrene, 50 parts of No. 2 polymer (as obtained in Example 1), and 0.2 part of 2,2'-azobisisobutyronitrile. Suspension polymerization was performed at 60° C. for 20 hours. Conversion to polymer was 98.2%. After filtration, rinsing, and drying, there was obtained 145 parts of polymethyl methacrylate-polystyrene block copolymer. A clear film was obtained by casting from a toluene solution of this block copolymer.

EXAMPLE 23

0.05 part of PVA 217 (polyvinyl alcohol, degree of polymerization: 1700, degree of saponification: 88 mol%, Product of Kuraray Co., Ltd.) was dissolved in 100 parts of water at 90° C. The solution was cooled to 60° C. under a nitrogen stream. To this solution was added a vinyl acetate solution composed of 100 parts of vinyl acetate, 30 parts of No. 2 polymer (as obtained in Example 1), and 0.1 part of benzoyl peroxide. Suspension polymerization was performed at 60° C. for 10 hours. Conversion to polymer was 92%. Unreacted monomer was removed under reduced pressure. After filtration, rinsing, and drying, there was obtained 140 parts of polymethyl methacrylate-polyvinyl acetate block copolymer. 50 parts of this block copolymer was dissolved in 50 parts of methanol, and to the solution was added at 40° C. an NaOH solution in methanol so that the molar ratio of NaOH to vinyl acetate became 0.05. Thus there was obtained a polymethyl methacrylate-polyvinyl alcohol block copolymer. A clear film was obtained by casting methanol solution of polymethyl methacrylate-polyvinyl acetate block copolymer.

EXAMPLE 24

Preparation of polyvinyl acetate-polyoxyethylene block copolymer and polyvinyl alcohol-polyoxyethylene block copolymer.

Into a reactor were charged 960 parts of vinyl acetate (abbreviated as VAc hereinafter), 220 parts of methanol, and 4.20 parts of α,ω-dithiolpolyoxyethylene 4000. The atmosphere in the reactor was thoroughly replaced with nitrogen. The reactor was externally heated to 65° C., and when the internal temperature reached 60° C., 20 parts of methanol containing 0.694 part of 2,2'-azobisisobutyronitrile was added. Immediately thereafter, 90 parts of methanol solution containing 49.9 parts of No. 1 polymer obtained in Example 19 (α,ω-dithiolpolyoxyethylene 4000) was added at a constant rate over 4.5 hours. Conversion to polymer for 4.5 hours was 50.6%. After cooling, unreacted VAc was distilled away together with methanol under reduced pressure. This step was repeated by adding methanol. Thus there was obtained a 43.2% solution of polyvinyl acetate-polyoxyethylene block copolymer in methanol. To this methanol solution was added at 40° C. an NaOH solution in methanol so that the molar ratio of NaOH to vinyl acetate became 0.05. The solution was allowed to stand for saponification. Thus there was obtained a block copolymer of polyvinyl alcohol and polyoxyethylene. The block copolymer was washed with methanol, purified, and dried to give white powder. The intrinsic viscosity of polyvinyl acetate-polyoxyethylene block copolymer was 0.52 dl/g as measured in acetone at 30° C. $\{[\eta]=\eta sp/c/(1+0.275\eta_{sp})$ according to single-point determination.$\}$ The weight fraction of polyoxyethylene in the block copolymer was found to be 11.2% by H-NMR (in DMSO-$d_6$). The degree of saponification of the PVA portion was 99.0 mol%. Clear films were obtained by casting a methanol solution of polyvinyl acetate-polyoxyethylene block copolymer and by casting a water solution of polyvinyl alcohol-polyoxyethylene block copolymer.

EXAMPLES 25 TO 27

Polyvinyl acetate-polyoxyethylene block copolymers and polyvinyl alcohol-polyoxyethylene block copolymers, both with the quantities of α,ω-dithiolpolyoxyethylene 4000 (No. 1 polymer prepared in Example 19) varied, were prepared in the same way as in Example 24. Table 3 shows the polymerization conditions employed, the results of polymerization, and the properties of the resulting block copolymers.

A 10% aqueous solution of polyvinyl alcohol-polyoxyethylene block copolymer obtained in Example 27 was made into film by casting. On the other hand, a 10% aqueous solution of polymer blend having the same composition as this block copolymer was also made into film by casting. (This polymer blend is a mixture of polyvinyl alcohol and polyoxyethylene.)

TABLE 3

| Example | Quantity of AIBN (g) | Q'ty of α,ω-dithiol-polyoxyethylene 4000 (g) | | Polymerization time (hr) | Conversion to polymer (%) | [η] (dl/g) | Content of polyoxyethylene (wt %) | Degree of saponification of PVA (mol %) |
|---|---|---|---|---|---|---|---|---|
| | | Initial charge | Subsequent charge | | | | | |
| 25 | 0.173 | 0.60 | 7.12 | 4.5 | 38.7 | 0.78 | 4.5 | 98.9 |

TABLE 3-continued

| Example | Quantity of AIBN (g) | Q'ty of α,ω-dithiol-polyoxyethylene 4000 (g) | | Polymerization time (hr) | Conversion to polymer (%) | [η] (dl/g) | Content of polyoxyethylene (wt %) | Degree of saponification of PVA (mol %) |
|---|---|---|---|---|---|---|---|---|
| | | Initial charge | Subsequent charge | | | | | |
| 26 | 0.347 | 0.60 | 7.12 | 4.5 | 42.5 | 0.68 | 7.0 | 98.7 |
| 27 | 0.347 | 4.20 | 49.9 | 4.5 | 26.2 | 0.32 | 21.7 | 99.0 |

The film made of the block copolymer was clear and uniform, whereas the film made of the mixture was cloudy with phase separation.

EXAMPLE 28

α,ω-dithiolpolyoxyethylene 6000 was prepared in the same way as in Example 19 for No. 1 polymer, except that polyethylene glycol 4000 was replaced by polyethylene glycol 6000 (average molecular weight: 8500, a product of Wako Yakuhin Co., Ltd.) The quantity of thiol groups determined by iodimetry was $1.67 \times 10^{-4}$ eq/g. Using this α,ω-dithiolpolyoxyethylene 6000, polymerization was performed in the same way as in Example 24. There were obtained a polyvinyl acetate-polyoxyethylene block copolymer and a polyvinyl alcohol-polyoxyethylene block copolymer. Table 4 shows the polymerization conditions employed, the results of polymerization, and the properties of the resulting block copolymers.

A 10% aqueous solution of the polyvinyl alcohol-polyoxyethylene block copolymer obtained in Example 28 was made into film by casting. On the other hand, a 10% aqueous solution of polymer blend having the same composition as this block copolymer was also made into film by casting. (This polymer blend is a mixture of polyvinyl alcohol and polyoxyethylene.) The film made of the block copolymer was clear and uniform, late thus obtained was separated and thoroughly washed with distilled water and dried. 200 g of this polypropylene glycol ditosylate was dissolved in 300 ml of ethanol. To the solution was added 30 g of thiourea, and reaction was performed for 120 hours under reflux. Then, 17 g of sodium hydroxide and 100 g of distilled water were added under a nitrogen stream, and reaction was performed for 3 hours under reflux. After cooling to room temperature, the solution was neutralized to pH 3 to 3.5 with a 10% $H_2SO_4$ aqueous solution. By extraction with 1 liter of methylene chloride, there was obtained a methylene chloride solution of α,ω-dithiolpolyoxypropylene. The methylene chloride solution was thoroughly washed with water and dehydrated with $Na_2SO_4$. Methylene chloride was distilled away under reduced pressure. Thus there was obtained α,ω-dithiolpolyoxypropylene. The quantity of thiol groups in this product determined by iodimetry was $4.80 \times 10^{-4}$ eq/g. Preparation of block copolymer.

Using this α,ω-dithiolpolyoxyethylene 2000, polymerization was performed in the same way as in Example 24. There were obtained a polyvinyl acetatepolyoxypropylene block copolymer and a polyvinyl alcohol-polyoxypropylene block copolymer. Table 5 shows the polymerization conditions employed, the results of polymerization, and the properties of the resulting block copolymers.

Clear films were obtained by casting aqueous solu-

TABLE 4

| Example | Quantity of AIBN (g) | Q'ty of α,ω-dithiol-polyoxyethylene 6000 (g) | | Polymerization time (hr) | Conversion to polymer (%) | [η] (dl/g) | Content of polyoxyethylene (wt %) | Degree of saponification of PVA (mol %) |
|---|---|---|---|---|---|---|---|---|
| | | Initial charge | Subsequent charge | | | | | |
| 28 | 0.173 | 5.07 | 66.9 | 5.0 | 13.6 | 0.46 | 34.3 | 98.5 | whereas the film made of the mixture was cloudy with phase separation.

EXAMPLES 29 TO 30

Preparation of polypropylene glycol having thiol groups at both ends.

200 g of polypropylene glycol 2000 (average molecular weight: 2000, a product of Sanyo Chemical Co., Ltd.) was dissolved in 200 ml of pyridine. To the solution was added 77 g of tosyl chloride, and reaction was performed at 25° C. for 24 hours. The resulting salt was filtered off and the filtrate was poured into a large amount of distilled water. Polypropylene glycol ditosytions of polyvinyl alcohol-polyoxypropylene block copolymers.

EXAMPLES 31 AND 32

Preparation of polyvinyl acetate-polymethyl methacrylate block copolymer and polyvinyl alcohol-polymethyl methacrylate block copolymer.

A block copolymer was obtained in the same way as in Example 24 from polymethyl metharcylate having a thiol group at one end which was obtained in Example 1, except that methanol as a solvent for α-thiol-PMMA was replaced by methyl acetate. Table 6 shows the

TABLE 5

| Example | Quantity of AIBN (g) | Q'ty of α,ω-dithiol-polyoxypropylene 2000 (g) | | Polymerization time (hr) | Conversion to polymer (%) | [η] (dl/g) | Content of polyoxypropylene (wt %) | Degree of saponification of PVA (mol %) |
|---|---|---|---|---|---|---|---|---|
| | | Initial charge | Subsequent charge | | | | | |
| 29 | 0.173 | 0.71 | 5.58 | 3.0 | 29.3 | 0.67 | 1.9 | 98.7 |
| 30 | 0.173 | 1.76 | 18.6 | 4.0 | 26.1 | 0.40 | 12.0 | 98.5 |

TABLE 6

| Example | Quantity of AIBN (g) | Q'ty of -thiol-PMMA (g) Initial charge | Q'ty of -thiol-PMMA (g) Subsequent charge | Polymerization time (hr) | Conversion to polymer (%) | $[\eta]$* (dl/g) | Content of PMMA (wt %) | Degree of saponification of PVA (mol %) |
| --- | --- | --- | --- | --- | --- | --- | --- | --- |
| 31 | 0.173 | 1.69 | 15.6 | 3.0 | 37.8 | 0.65 | 7.5 | 99.0 |
| 32 | 0.173 | 4.65 | 42.9 | 3.0 | 36.8 | 0.45 | 18.9 | 98.6 |

*Polyvinyl acetate-polymethyl methacrylate block copolymer: measured in acetone at 30° C.

polymerization conditions employed, the results of polymerization, and the properties of the resulting block copolymers.

Clear films were obtained by casting aqueous solutions of polyvinyl alcohol-polymethyl methacrylate block copolymers.

EXAMPLE 33

No. 3 polymer. (Vinyl ester polymer having a thiol group at one end as obtained in Example 13)

No. 4 polymer and No. 5 polymer.

Two kinds of PVAc were prepared in the same way as for No. 3 polymer, with the quantity of thiolacetic acid varied. They were treated with 25% ammonia water to give PVAc having a thiol group. The results are shown in Table 7.

TABLE 7

| PVAc No. | Thiolacetic acid charge (parts) | Thiolacetic acid subsequent charge (parts) | Degree of polymerization | Content of SH (eq/g) | Content of vinyl alcohol (mol %) | Content of vinyl acetate (mol %) |
| --- | --- | --- | --- | --- | --- | --- |
| 4 | 0.45 | 8.41 | 248 | $1.30 \times 10^{-4}$ | 9.6 | 90.4 |
| 5 | 0.29 | 5.40 | 405 | $9.08 \times 10^{-5}$ | 7.2 | 92.8 |

50 parts of vinyl ester polymer (No. 3 polymer) was dissolved in 280 parts of toluene. To the solution was added 100 parts of methyl methacrylate (abbreviated as MMA). The atmosphere in the reactor was replaced with nitrogen, and the reactor was heated. When the internal temperature reached 80° C., 20 parts of toluene containing 0.3 part of 2,2'-azobisisobutyronitrile was added. After polymerization for 5 hours, there was obtained a toluene solution of polyvinyl ester-PMMA block copolymer. The solid concentration was 32.7%.

A 5% acetone solution of the polyvinyl ester-PMMA block copolymer obtained in Example 33 was made into film by casting. On the other hand, a 5% acetone solution of a polymer blend having the same composition as this block copolymer was also made into film by casting. (This polymer blend is a mixture of polyvinyl ester and PMMA.) The film made of the block copolymer was clear and uniform, whereas the film made of the polymer blend was cloudy with phase separation.

EXAMPLES 34 TO 38

Five kinds of block copolymers, each containing a vinyl ester polymer as one component, were prepared in the same way as in Example 33 from vinyl ester polymers (No. 3 to No. 5 polymers). The results are shown in Table 8. (The polymerization temperature was 60° C. in the case where methanol was used as the solvent for polymerization.)

EXAMPLE 39

0.1 part of PVA 217 (polyvinyl alcohol, degree of polymerization: 1700, degree of saponification: 88 mol%, product of Kuraray Co., Ltd.) was dissolved in 100 parts of distilled water at 90° C. The solution was cooled to 60° C. under a nitrogen stream. To this solution was added a styrene solution composed of 100 parts of styrene, 50 parts of No. 4 polymer, and 0.3 part of 2,2'-azobisisobutyronitrile. Suspension polymerization was performed at 60° C. for 20 hours. Conversion to polymer was 99.0%.

After filtration, rinsing, and drying, there was obtained 144 parts of polyvinyl ester-polystyrene block copolymer. A clear film was obtained by casting a toluene solution of this block copolymer.

TABLE 8

| Example | Solvent | Polyvinyl ester No. | Polyvinyl ester Quantity | Monomer Kind | Monomer Quantity | Polymerization Time (hr) | Polymerization Solids (%) | Film obtained from polymer Solvent | Film obtained from polymer Film |
| --- | --- | --- | --- | --- | --- | --- | --- | --- | --- |
| 34 | Methanol 300 | 4 | 50 | Acrylic acid | 100 | 5.0 | 33.5 | Methanol | Clear |
| 35 | Toluene 300 | 3 | 30 | Styrene | 100 | 20.0 | 30.0 | Toluene | Clear |
| 36 | Toluene 300 | 5 | 20 | n-Butyl acrylate | 100 | 5.0 | 27.9 | Toluene | Clear |
| 37 | Methanol 300 | 4 | 50 | N,N—dimethyl-acrylamide | 100 | 5.0 | 33.6 | Methanol | Clear |
| 38 | Methanol 300 | 3 | 20 | Methacrylic acid | 100 | 5.0 | 28.7 | Methanol | Clear |

EXAMPLE 40

No. 6 polymer (PVA polymer having a thiol group at one end as prepared in Example 6)

No. 7 polymer and No. 8 polymer.

Two kinds of PVA polymers having a thiol group at one end were prepared by polymerizing and saponifying in the same way as for No. 6 polymer, with the quantity of thiolacetic acid varied. The results are shown in Table 9.

TABLE 9

| PVA No. | Thiolacetic acid Initial charge (parts) | Thiolacetic acid subsequent charge (parts) | Properties of PVA Degree of saponification (mol %) | Properties of PVA Content of SH (eq/g) | Properties of PVA Degree of polymerization |
| --- | --- | --- | --- | --- | --- |
| 7 | 0.45 | 8.41 | 98.7 | $1.30 \times 10^{-4}$ | 250 |
| 8 | 0.29 | 5.40 | 99.0 | $9.08 \times 10^{-5}$ | 412 |

Note:
(Concentration of PVAc at the time of saponification was 40%.)

No. 9 polymer.

A portion of the methanol solution of PVAc obtained in the process of preparing No. 7 polymer was saponified at 40° C. under the following conditions to give a partially saponified product.
Concentration of PVAc: 40%
Molar ratio of NaOH to VAc: 0.010
The results are shown in Table 10.

TABLE 10

| PVA No. | Degree of saponification (mol %) | Content of SH (eq/g) | Degree of polymerization |
|---|---|---|---|
| 9 | 86.5 | $1.35 \times 10^{-4}$ | 240 |

Ten parts of No. 6 polymer (PVA having a thiol group at one end) was dissolved in 110 parts of distilled water at 95° C. The solution was cooled to 30° C. under a nitrogen stream. To the solution were added 10 parts of acrylic acid and then 10 parts of aqueous solution containing 0.32 part of potassium bromate. Polymerization was started at 30° C. and continued for 2 hours. Conversion to polymer was 100.1%. There was obtained a 14.4% (solid concentration) aqueous solution of PVA-polyacrylic acid block copolymer. A clear film was obtained from this aqueous solution by casting.

EXAMPLE 41

Ten parts of No. 8 polymer (PVA having a thiol group at one end) was dissolved in 108 parts of distilled water at 95° C. The solution was cooled to room temperature under a nitrogen stream. To the solution was added 10 parts of acrylic acid. The temperature was raised to 60° C., and polymerization was started by adding 12 parts of aqueous solution containing 0.152 part of potassium bromate at a constant rate of 2 ml/5 min over 30 minutes. Polymerization was continued for 2 hours. Conversion to polymer was 101.4%.

There was obtained a 14.9% (solid concentration) aqueous solution of PVA-polyacrylic acid block copolymer. A clear film was obtained from this aqueous solution by casting.

EXAMPLE 42

Ten parts of No. 7 polymer (PVA having a thiol group at one end) was dissolved in 108 parts of distilled water at 95° C. The solution was cooled to room temperature. The solution was adjusted to pH 3 with 0.5N H$_2$SO$_4$. To the solution was added 10 parts of acrylamide. The atmosphere in the reactor was replaced with nitrogen and the temperature was raised to 60° C. Polymerization was started by adding an aqueous solution containing 0.217 part of potassium bromate at a contant rate of 2 ml/5 min over 30 minutes. Polymerization was continued for 90 minutes.

Conversion to polymer was 101.7%. There was obtained a 14.5% (solid concentration) aqueous solution of PVA-polyacrylamide block copolymer.

A 5% aqueous solution of the PVA-polyacrylamide block copolymer obtained in Example 42 was made into film by casting. On the other hand, a 5% aqueous solution of a polymer blend having the same composition as this block copolymer was also made into film by casting. (This polymer blend is a mixture of PVA and polyacrylamide.) The film made of the block copolymer was clear and uniform, whereas the film made of the polymer blend was cloudy with phase separation.

EXAMPLES 43 TO 46

Block copolymers having PVA as one component were prepared in the same way as in Example 42. Table 11 shows the conditions and results of polymerization.

The aqueous emulsions of polymers obtained in Examples 44 to 46 were made into film by casting.

The resulting films were clear. On the other hand, emulsions of polymer blends each having the same composition as the polymers obtained in Examples 44 and 46 were made into films by casting. (These polymer

TABLE 11

| | | PVA | | Monomer | | KBrO$_3$ | | Results of Polymerization | | |
|---|---|---|---|---|---|---|---|---|---|---|
| Example | Water | No. | Quantity | Kind | Quantity | Quantity | Time for addition | Polymerization time | Conversion to polymer | Solid content |
| 43 | 120 | 7 | 10 | DMA | 10 | 0.217 | 60 min | 1.5 hr | 99.3% | 14.1% |
| 44 | 120 | 7 | 10 | EA | 9.5 | 0.217 | 60 | 1.5 | 96.8 | 13.9 |
| | | | | AA | 0.5 | | | | | |
| 45 | 120 | 8 | 10 | VAc | 10 | 0.152 | 60 | 2.0 | 100.2 | 14.3 |
| 46 | 120 | 6 | 10 | St | 10 | 0.320 | 60 | 2.0 | 98.5 | 14.0 |

DMA: N,N—dimethylacrylamide
EA: Ethyl acrylate
AA: Acrylic acid
VAc: Vinyl acetate
St: Styrene blends are mixtures of EA-AA copolymer emulsion and PVA, and polystyrene emulsion and PVA.) The films made of the polymer blends were hazy. A partially saponified polyvinyl alcohol (degree of saponification 49.5 mol%) was dissolved in a mixed solvent of methanol-water (50/50). This solution was made into film by casting.

The resulting film had a tensile strength of 1 kg/mm$^2$. Also, an aqueous emulsion of the polymer obtained in Example 45 was made into film by casting. The resulting film was clear and had a tensile strength of 4 kg/mm$^2$.

A 5% aqueous solution of the PVA-N,N-dimethylacrylamide block copolymer obtained in Example 43 was made into film by casting. On the other hand, a 5% aqueous solution of a polymer blend having the same composition as this block copolymer was also made into film by casting. (This polymer blend is a mixture of PVA and poly-N,N-dimethylacrylamide.) The film made of the block copolymer was clear and uniform, whereas the film made of the polymer blend was cloudy with phase separation.

EXAMPLE 47

Ten parts of No. 8 polymer (PVA having a thiol group at one end) was dissolved in 110 parts of distilled water at 95° C. The solution was cooled to room temperature. The solution was adjusted to pH 3 with 0.5N H$_2$SO$_4$. To the solution was added 10 parts of acrylamide. The atmosphere in the reactor was replaced with nitrogen and the temperature was raised to 60° C. Polymerization was started by adding all at once an aqueous solution containing 0.2 part of potassium persulfate. Polymerization took 2 hours. Conversion to polymer was 99.7%. There was obtained a 14.3% (solid concentration) aqueous solution of PVA-polyacrylamide block copolymer.

A 5% aqueous solution of the PVA-polyacrylamide block copolymer obtained in Example 47 was made into film by casting. On the other hand, a 5% aqueous solution of a polymer blend having the same composition as this block copolymer was also made into film by casting. (This polymer blend is a mixture of PVA and polyacrylamide.) The film made of the block copolymer was clear and uniform, whereas the film made of the polymer blend was cloudy with phase separation.

EXAMPLE 48

Polymerization was performed in the same way as in Example 47, except that the monomer was replaced by methyl acrylate. Polymerization took 2 hours. Conversion to polymer was 99.6%. There was obtained a 14.3% (solid concentration) aqueous dispersion of PVA-polymethyl acrylate block copolymer.

A clear film was obtained from this aqueous dispersion by casting.

EXAMPLE 49

Ten parts of 30% aqueous solution of No. 6 polymer (PVA having a thiol group at one end) was dissolved in 43 parts of distilled water. The solution was adjusted to about pH 3 with 0.5N $H_2SO_4$. To the solution were added 40 parts of methanol and 17 parts of methyl methacrylate. The atmosphere in the reactor was replaced with nitrogen and the temperature was raised to 65° C. Polymerization was started by adding 10 parts of methanol solution containing 0.034 parts of 2,2'-azobisisobutyronitrile. Conversion to polymer after 6 hours of polymerization was 98%. There was obtained PVA-methyl polymethacrylate block copolymer in aqueous dispersion with partial precipitates.

A clear film was obtained from this aqueous dispersion by casting.

EXAMPLE 50

Polymerization was performed in the same way as in Example 41, except that No. 9 polymer (PVA having a thiol group at one end of the molecule) was used. Conversion to polymer was 100.5%. There was obtained a 14.7% (solid concentration) aqueous solution of PVA-polyacrylic acid block copolymer.

A clear film was obtained from this aqueous solution by casting.

What is claimed is:

1. A polymer having a thiol group at one end obtained by polymerizing at least one monomer capable of radical polymerization in contact with a thiolcarboxylic acid represented by the formula R—COSH wherein R is a $C_1$-$C_{18}$ aliphatic or aromatic hydrocarbon group; and then treating the resulting polymer wtih an alkali or acid.

2. The polymer having a thiol group at one end as set forth in claim 1, wherein the thiolcarboxylic acid is thiolacetic acid.

3. The polymer having a thiol group at one end as set forth in claim 1, wherein said monomer capable of radical polymerization is selected from the group consisting of a vinyl ester, a vinyl halide, an aromatic vinyl compound, an α-olefin, acrylic acid, methacrylic acid, acrylic ester, methacrylic ester, acrylamide, methacrylamide, acrylonitrile and methacrylonitrile.

4. A vinyl polymer having a thiol group at one end, said polymer being represented by the formula PSH, wherein P contains at least one of the constituent units represented by the following formulas,

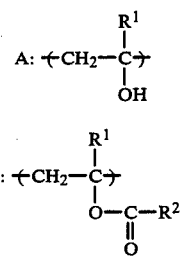

wherein $R^1$ is hydrogen or a $C_{1-6}$ hydrocarbon group, and $R^2$ is hydrogen or a $C_{1-20}$ hydrocarbon group and having a degree of polymerization lower than 3500.

5. The process for producing a vinyl polymer having a thiol group at one end as set forth in claim 4 which comprises subjecting at least one vinyl ester monomer to radical polymerization in contact with a thiolcarboxylic acid represented by the general formula R—COSH wherein R is a $C_1$-$C_{18}$ aliphatic or aromatic hydrocarbon group; and then treating the resulting polymer with an alkali or acid.

6. The vinyl ester polymer having a thiol group at one end as claimed in claim 4, said polymer being represented by the formula PSH, wherein P contains constituent units represented by the following formulas,

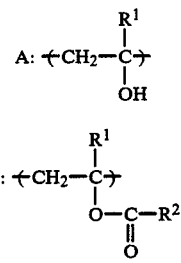

(wherein $R^1$ is hydrogen or a $C_{1-6}$ hydrocarbon group, and $R^2$ is hydrogen or a $C_{1-20}$ hydrocarbon group the content of B being not less than 50 mol% and not greater than 100 mol%, and having a degree of polymerization lower than 3500.

7. The process for producing a vinyl ester polymer having a thiol group at one end as set forth in claim 6 which comprises polymerizing at least one vinyl ester monomer in contact with a thiolcarboxylic acid represented by the general formula R—COSH wherein R is a $C_1$-$C_{18}$ aliphatic or aromatic hydrocarbon group; and then treating the resulting polymer with ammonia or an amine.

8. The vinyl alcohol polymer having a thiol group at one end as set forth in claim 4, wherein the content of A units comprises an amount not greater than 100 mol% and not less than 50 mol%, and having a degree of polymerization lower than 3500.

9. A process for producing a polymer as defined in claim 8 which comprises polymerizing at least one vinyl ester monomer in contact with a thiolcarboxylic acid represented by the general formula R—COSH wherein R is a $C_1$-$C_{18}$ aliphatic or aromatic hydrocarbon group; and then saponifying the resulting polymer.

* * * * *